US012596501B2

(12) United States Patent
Clarke

(10) Patent No.: US 12,596,501 B2
(45) Date of Patent: Apr. 7, 2026

(54) SYSTEMS AND METHODS FOR ALLOCATING READ BUFFERS BASED ON READ DATA SIZES IN NON-VOLATILE STORAGE DEVICES

(71) Applicant: Kioxia Corporation, Tokyo (JP)

(72) Inventor: Brian Clarke, Milton (GB)

(73) Assignee: KIOXIA CORPORATION, Tokyo (JP)

( * ) Notice: Subject to any disclaimer, the term of this patent is extended or adjusted under 35 U.S.C. 154(b) by 0 days.

(21) Appl. No.: 18/478,293

(22) Filed: Sep. 29, 2023

(65) Prior Publication Data

US 2025/0110661 A1 Apr. 3, 2025

(51) Int. Cl.
*G06F 3/06* (2006.01)

(52) U.S. Cl.
CPC .......... *G06F 3/0656* (2013.01); *G06F 3/0604* (2013.01); *G06F 3/0631* (2013.01); *G06F 3/0659* (2013.01); *G06F 3/0679* (2013.01)

(58) Field of Classification Search
CPC .... G06F 3/0656; G06F 3/0604; G06F 3/0631; G06F 3/0659; G06F 3/0679
USPC .......................................................... 711/154
See application file for complete search history.

(56) References Cited

U.S. PATENT DOCUMENTS

| | | | | |
|---|---|---|---|---|
| 5,289,470 A | * | 2/1994 | Chang ..................... | H04L 49/90 |
| | | | | 379/88.28 |
| 2016/0378365 A1 | * | 12/2016 | Shih ...................... | G06F 3/0611 |
| | | | | 711/162 |
| 2018/0188952 A1 | * | 7/2018 | Carlton ................. | G06F 3/0679 |
| 2019/0324658 A1 | * | 10/2019 | Walsh ................... | G06F 3/0653 |
| 2021/0303199 A1 | * | 9/2021 | Horspool ............. | G06F 3/0614 |
| 2022/0057958 A1 | * | 2/2022 | Patriarca ................ | G06F 3/061 |
| 2022/0147276 A1 | * | 5/2022 | Watanabe ............. | G06F 3/0604 |
| 2023/0043990 A1 | * | 2/2023 | Watanabe ............. | G06F 3/0653 |

* cited by examiner

*Primary Examiner* — Arpan P. Savla
*Assistant Examiner* — Sidney Li
(74) *Attorney, Agent, or Firm* — Foley & Lardner LLP

(57) ABSTRACT

A system may include a non-volatile memory (NVM), a first memory, a second memory that has a higher speed than the first memory, and a controller. The controller may be configured to receive a first read command from a host computer, and determine a size of one or more buffers that are allocated for one or more read commands that have been received and not returned read data to the host computer. The controller may be configured to determine a number of the one or more read commands, and determine, based on at least the size of the one or more buffers and the number of the one or more read commands, whether to start processing the first read command. In response to determining to start processing the first read command, the controller may be configured to allocate, in the first memory, a first buffer for the first read command.

19 Claims, 5 Drawing Sheets

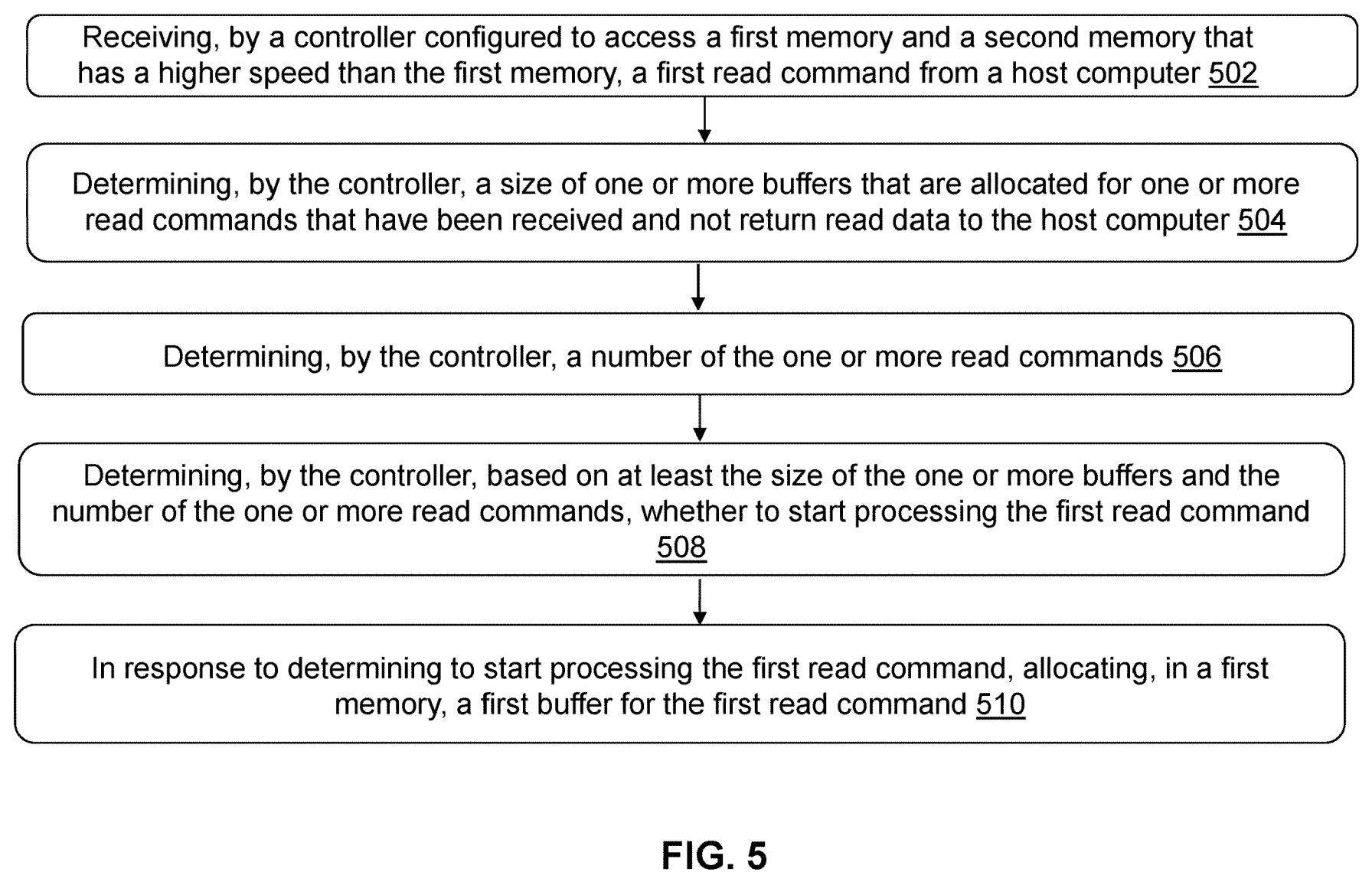

Receiving, by a controller configured to access a first memory and a second memory that has a higher speed than the first memory, a first read command from a host computer 502

Determining, by the controller, a size of one or more buffers that are allocated for one or more read commands that have been received and not return read data to the host computer 504

Determining, by the controller, a number of the one or more read commands 506

Determining, by the controller, based on at least the size of the one or more buffers and the number of the one or more read commands, whether to start processing the first read command 508

In response to determining to start processing the first read command, allocating, in a first memory, a first buffer for the first read command 510

FIG. 5

SYSTEMS AND METHODS FOR ALLOCATING READ BUFFERS BASED ON READ DATA SIZES IN NON-VOLATILE STORAGE DEVICES

TECHNICAL FIELD

The arrangements described herein relate generally to operating a data storage device using read buffers for data transfer to a non-volatile memory, and more particularly to improving availability of read buffers in a memory by allocating read buffers based on data sizes of read commands.

BACKGROUND

Storage devices can read data blocks from a non-volatile memory (NAND) via volatile memory buffers. A controller in a storage device (e.g., a solid-state drive (SSD) controller) can utilize a hybrid read buffer with both a (relatively) high speed memory and a (relatively) low speed memory. The controller may allocate a read buffer as a host read command to read data is accepted into the controller. Once the NAND read time has elapsed, the data can be read out from the NAND and stored or held in a read buffer. At the read-out time, if a space in the high speed memory is available, the space can be used to accommodate the data; otherwise the low speed memory can be used which may decrease a throughput. The latency incurred from starting to read out the data from the NAND to completing transfer of that data across a host interface to the host may depend on the data size of the host read command and impact the length of time for which a space in the read buffer is occupied. In some cases, the system must wait to accept a read command until sufficient transfers back to a host computer from earlier commands have occurred to free sufficient buffer space to accommodate the whole read command, which may also incur latency. None of the NAND reads required by the read command can begin until the entire read command has been accepted. Smaller read commands have an advantage here. Given limited size of the high speed memory and various data sizes of host read commands, improvements in efficiency of processing read commands and availability of read buffers in the hybrid memory remain desired.

SUMMARY

The present arrangements relate to systems and methods for improving availability of read buffers in a memory by allocating read buffers based on data sizes of read commands.

According to some arrangements, a system may include a non-volatile memory (NVM), a first memory, a second memory that has a higher speed than the first memory, and a controller. The controller may be configured to receive a first read command from a host computer. The controller may be configured to determine a size of one or more buffers that are allocated for one or more read commands that have been received and not returned read data to the host computer. The controller may be configured to determine a number of the one or more read commands. The controller may be configured to determine, based on at least the size of the one or more buffers and the number of the one or more read commands, whether to start processing the first read command. In response to determining to start processing the first read command, the controller may be configured to allocate, in the first memory, a first buffer for the first read command.

According to some arrangements, a method for reading data from a non-volatile memory (NVM) may include receiving, by a controller configured to access a first memory and a second memory that has a higher speed than the first memory, a first read command from a host computer. The method may include determining, by the controller, a size of one or more buffers that are allocated for one or more read commands that have been received and not returned read data to the host computer. The method may include determining, by the controller, a number of the one or more read commands. The method may include determining, by the controller, based on at least the size of the one or more buffers and the number of the one or more read commands, whether to start processing the first read command. The method may include in response to determining to start processing the first read command, allocating, in a first memory, a first buffer for the first read command.

BRIEF DESCRIPTION OF THE DRAWINGS

These and other aspects and features of the present arrangements will become apparent to those ordinarily skilled in the art upon review of the following description of specific arrangements in conjunction with the accompanying figures, wherein:

FIG. 4A and FIG. 4B are diagrams showing performance of an SSD when allocating read buffers based on data sizes of read commands, according to some arrangements; and FIG. 5 is a flowchart illustrating an example methodology for allocating read buffers based on data sizes of read commands in an SSD, according to some arrangements.

DETAILED DESCRIPTION

Some arrangements in the present disclosure relate to techniques for improving availability of read buffers in a memory by allocating read buffers based on data sizes of read commands.

Figure 1:
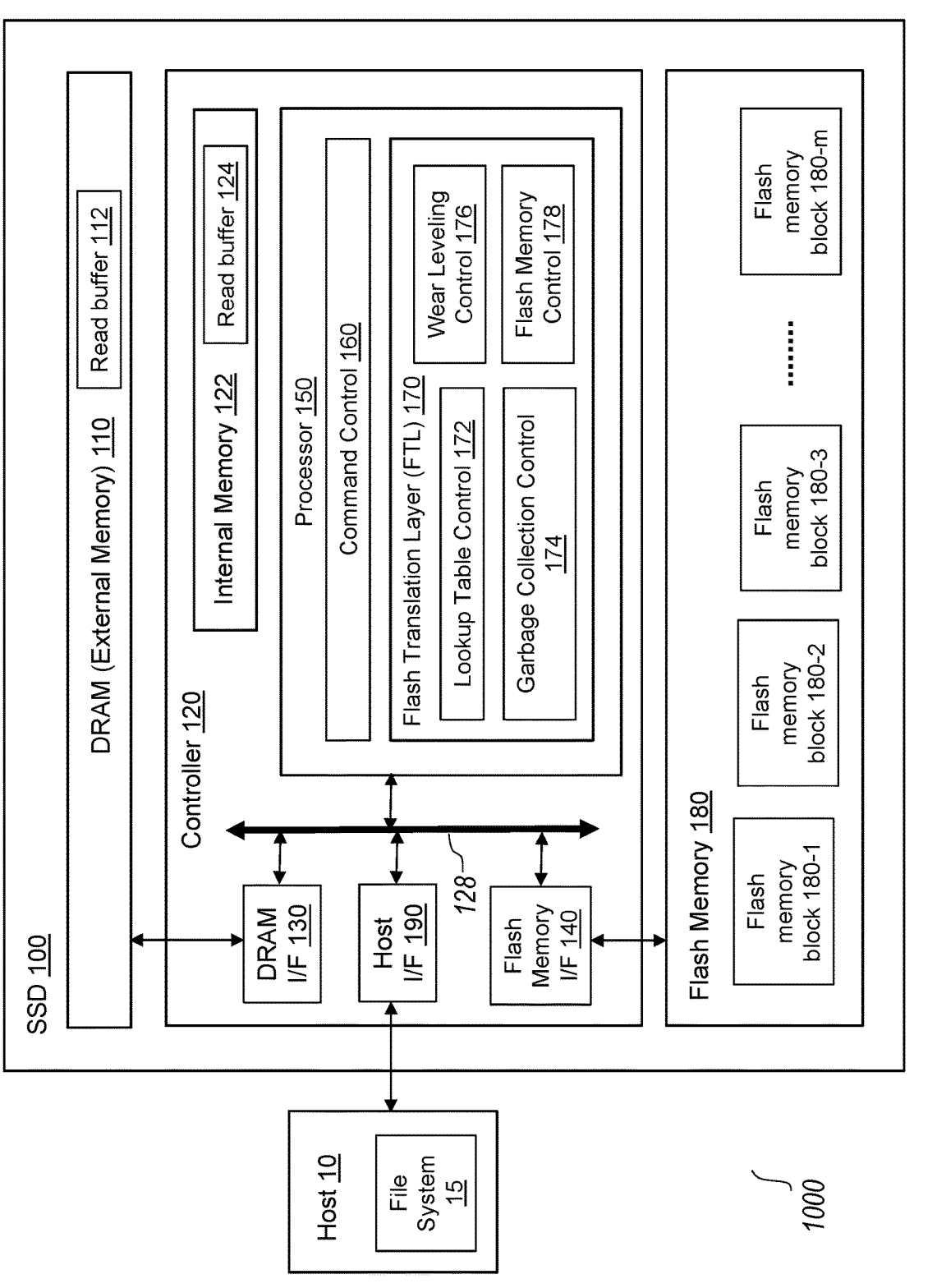
FIG. 1 is a block diagram illustrating an example computer system including a solid-state drive (SSD)

In some arrangements, in solid-state drives (SSDs), when read commands are received from a host (e.g., host read commands), a controller can read out data from a non-volatile memory (e.g., NAND) and temporarily save the read data in a volatile memory. A "read buffer" may refer to an area of a volatile memory temporarily storing the read data. In some arrangements, for a host read command, a space for a read buffer must be available in the memory to accept the whole data of the host read command so that the read buffer is available (e.g., allocated in the memory) once NAND is ready to supply data for any clusters or blocks within the host read command. FIG. 1 shows a configuration in which SSDs use a read buffer for data read out from a non-volatile memory.

FIG. 1 is a block diagram illustrating an example computer system according to some arrangements. Referring to FIG. 1, a computer system 1000 may include a host 10 and an SSD 100, which is a storage device and may be used as a main storage of an information processing apparatus (e.g., the host 10). The SSD 100 may be incorporated in the information processing apparatus or may be connected to the information processing apparatus via a cable or a network.

The host 10 may be an information processing apparatus (computing device) that accesses the SSD 100. The host 10 may be a server (storage server) that stores a large amount of various data in the SSD 100, or may be a personal computer. The host includes a file system 15 used for controlling file operation (e.g., creating, saving, updating, or deleting). For example, ZFS, Btrfs, XFS, ext 4, or NTFS may be used as the file system 15. Alternatively, a file object system (e.g., Ceph Object Storage Daemon) or a key value store system (e.g., RocksDB) may be used as the file system 15.

The SSD 100 includes, for example, a controller 120 and a flash memory 180 as non-volatile memory (e.g., a NAND type flash memory). The SSD 100 may include a random access memory which is a volatile memory, for example, DRAM (Dynamic Random Access Memory) 110. In some arrangements, the controller 120 may include a random access memory (as an internal memory 122) such as SRAM (Static Random Access Memory). The random access memory such as the DRAM 110 has, for example, a read buffer 112 which is a buffer area for temporarily storing data read out from the flash memory 180, a write buffer (not shown) used for transferring data to the flash memory 180, and/or a buffer used for a garbage collection (not shown). In some arrangements, the internal memory 122 has, for example, a read buffer 124 which is a buffer area for temporarily storing data read out from the flash memory 180, a write buffer (not shown) used for transferring data to the flash memory 180, and/or a buffer used for a garbage collection (not shown).

In some arrangements, the flash memory 180 may include a memory cell array which includes a plurality of flash memory blocks (e.g., NAND blocks) 180-1 to 180-*m*. Each of the blocks 180-1 to 180-*m* may function as an erase unit. Each of the blocks 180-1 to 180-*m* includes a plurality of physical pages. In some arrangements, in the flash memory 180, data reading and data writing are executed on a page basis, and data erasing is executed on a block basis.

In some arrangements, the controller 120 may be a memory controller configured to control the flash memory 180. The controller 120 includes, for example, a processor (e.g., CPU) 150, a flash memory interface 140, and a DRAM interface 130, a host interface 190, all of which may be interconnected via a bus 128. The DRAM interface 130 may function as a DRAM controller configured to control an access to the DRAM 110. The flash memory interface 140 may function as a flash memory control circuit (e.g., NAND control circuit) configured to control the flash memory 180 (e.g., NAND type flash memory).

The host interface 190 may function as a circuit which receives various requests from the host 15 and transmits responses to the requests to the host 10. The requests may include various commands such as an I/O command and a control command. The I/O command may include, for example, a write command, a read command, a trim command (unmap command), a format command, and a flush command. The write command is also called a program command. The format command may be a command for unmapping the entire memory system (SSD 100). In some arrangements, the host interface 190 may implement one or more storage access protocols including peripheral component interconnect express (PCIe) and/or NVMe (nonvolatile memory express).

The processor 150 may be configured to control the flash memory interface 140, and the DRAM interface 130. The processor 150 may be configured to perform various processes by executing a control program (e.g., firmware) stored in, for example, a ROM (not shown). In some arrangements, the processor 150 may perform a command control 160 to execute command processing for processing various commands received from an information processing apparatus (e.g., a host computer). The processor 150 may be configured to function as a flash translation layer (FTL) 170 to execute data management and block management of the flash memory 180. The FTL 170 may include a look-up table control 172, a garbage collection control 174, a wear leveling control 176, and a flash memory control 178. The data management may include management of mapping information indicating a correspondence relationship between a logical address (e.g., LBA (logical block address)) and a physical address of the flash memory 180. In some arrangements, the look-up table control 172 may execute management of mapping between (1) each logical block address (LBA) or each logical page address and (2) each physical address using an address translation table (logical/physical address translation table). The garbage collection control unit 174 may execute garbage collection (GC) which is a process executed to generate a free block as a data write destination block. The wear leveling control 176 may execute wear leveling which is a process of leveling the number of times of block erasure so that by preventing an occurrence of blocks with a larger number of erasures, the failure probability of the SSD 100 can be reduced. The flash memory control unit 178 may execute control of the flash memory interface 140.

In some arrangements, an SSD controller (e.g., controller 120 or a controller system-on-chip (SoC)) can utilize a hybrid read buffer with both a (relatively) high speed memory (e.g., an internal memory 122, SRAM, etc.) and a (relatively) low speed memory (e.g., an external memory 110, DRAM, etc.). The controller may allocate a read buffer as a host read command to read data (e.g., clusters in the NAND) is accepted into the controller. Once the NAND read time has elapsed, the data can be read out from the NAND (e.g., a NAND die) and stored or held in a read buffer. At the read-out time, if a space in the high speed memory is available, the space can be used to accommodate the data; otherwise the low speed memory can be used which may decrease a throughput. The latency incurred from starting to read out the data from the NAND die to completing transfer of that data across the host interface (e.g., host interface 190 such as PCIe) to the host (e.g., host 10) may impact the length of time for which a space in the read buffer is occupied.

In one aspect, if a relatively small read buffer is allocated, larger host reads (e.g., host read commands for reading larger data) may incur longer latency while waiting for a space in the small read buffer to be available to accept the entire host read, compared to latency of smaller host commands (e.g., host read commands for reading smaller data). Thus, a relatively larger read buffer can be allocated to larger host read commands, compared to a read buffer allocated to smaller host read commands. In one aspect, assuming a sufficient queue depth from the host, there may be more smaller commands in the system than larger commands for a given read buffer size. The size of read buffers allocated to host read commands as the host read commands are accepted into the controller may be significantly greater than the amount of read buffers actually occupied by data read from NAND due to the combination of latencies involved as described above. The host may control the depth to which read commands are queued to a device (e.g., SSD 100) and may typically run tests using the same range of queue depths for each read command size. The host may generally expect performance to either remain constant or increase as the queue depth is increased.

In one aspect, it would be beneficial to balance the total size of read buffers between the (relatively) high speed memory and the (relatively) low speed memory in order to achieve a good throughput for a range of host read command sizes (e.g. data sizes of host read commands). For example, it would be beneficial to accept enough read commands to activate sufficient die in parallel, without causing significant amounts of read data to pass through the relatively low speed memory. If a simple fixed size read buffer is used to accept data of host commands until the read buffer is full, it would be difficult to find a single value of read buffer size to match the available memory space (e.g., available space for the relatively high speed memory) for read commands that achieves good performance by, for example, allocating larger read buffers for larger host read commands without causing overflow in the relatively low speed memory at read-out time. For example, the latencies associated with larger host commands result in the amount of read buffer being allocated for command acceptance being significantly larger than the amount of read buffer actually filled by data read-out by the NAND, whereas the latencies associated with smaller host commands do not produce a large difference between the allocated buffer size and the actually filled buffer size. This means that to avoid overflow into the low speed memory, there is a general problem of setting a buffer allocation limit (e.g., a size limit of read buffers that have been allocated, beyond which no read buffer is allocated to a new host read command) that can satisfy both the (relatively) larger buffer size for larger host read commands and the (relatively) smaller buffer size for smaller host read commands.

To solve this problem, according to certain aspects, arrangements in the present disclosure relate to techniques for efficiently processing read commands and improving availability of read buffers in a hybrid memory (e.g., relatively high speed memory and relatively low speed memory) by allocating read buffers based on data sizes of read commands. In some arrangements, a controller (e.g., SSD SoC controller) in a storage device may use a first threshold and a second threshold for allocating read buffers in a hybrid memory to improve a high speed memory hit rate for host read traffic for a wide range of data sizes of host read commands (e.g., 16 KB to 2 MB). The first threshold and the second threshold may be programmable by software, hardware, or firmware. In some arrangements, the first threshold and the second threshold may be experimentally determined to optimize or customize for a particular product or a particular stock keeping unit (SKU) of the product.

In some arrangements, the first threshold may indicate a buffer allocation limit or a size limit of read buffers that have been allocated in the hybrid memory. The first threshold may indicate a limit against the number of read buffers that have been allocated in the hybrid memory. In some arrangements, the first threshold may be greater than or equal to the size of the high speed memory or may be experimentally determined.

In some arrangements, the second threshold may indicate a level or limit against the number or count of read buffers that have been allocated, and/or the number or count of individual in-flight host commands. If the first threshold is exceeded, then the tests of the second threshold may be performed in order to determine whether the host read may still be accepted. In some embodiments, the second threshold may include a second threshold buffer count and a second threshold command count. In some arrangements, the tests of the second threshold may be performed such that if the count of read buffers allocated is less than the second threshold buffer count and the count of individual in-flight host (read) commands is less than the second threshold command count, then the host read may be accepted (e.g., may be processed). In some arrangements, the tests of the second threshold may be performed such that if the count of read buffers allocated is less (smaller) than or equal to the second threshold buffer count and the count of individual in-flight host (read) commands is less (smaller) than or equal to the second threshold command count, then the host read may be accepted (e.g., may be processed). If the count of read buffers allocated is greater than the second threshold buffer count, or the count of individual in-flight host (read) commands is greater than the second threshold command count, then the host read may not be accepted (e.g., may not be processed).

In order to solve the problem that it is difficult to set the first threshold to ideally suit both larger and smaller host commands, the second threshold may be set in order to accept enough commands to activate sufficient die in parallel, without causing significant amounts of read data to pass through the low speed memory. In some arrangements, the second threshold may be experimentally determined based on real or simulated host command traffic. For example, the second threshold may be the number or count of (relatively) mid-size host commands that can be allocated in the high speed memory without overflowing into the low speed memory.

In some arrangements, the controller can balance the total size of read buffers against the available high speed memory size for a range of host command sizes by using a pair of thresholds (e.g., first threshold and second threshold) upon allocating a read buffer to achieve good and consistent read throughput for a wide range of data sizes of host read commands and a wide range of queue depths of the host read commands. The first threshold and the second threshold can together serve to prevent smaller host read commands (e.g., host read commands to read relatively smaller data) at a high queue depth from overflowing into the low speed memory, while allowing a smaller number of larger host commands (e.g., host read commands to read relatively larger data) to be accepted into read buffers where the larger host commands may activate NAND die and which eventually at read-out time still avoid overflowing into the low speed memory.

In some arrangements, a front-end of the controller (e.g., a host interface controller of an SSD controller) may track, monitor, calculate or determine an amount of read buffers that have been allocated to the current in-flight host read commands (which have not been executed yet). The controller may determine whether the amount of allocated read buffers exceeds the first threshold. In response to determining that the amount of allocated read buffers does not exceed (or is smaller than or equal to) the first threshold, the controller (e.g., the front-end of the controller) may start to process or execute a next host read command. In response to determining that the amount of allocated read buffers exceeds the first threshold, the controller may determine whether the number of the read buffers that have been allocated or the number of in-flight host read commands exceeds the second thresholds. In response to determining that the second threshold is exceeded, the controller (e.g., the front-end of the controller) may not start to process the next host read command. In response to determining that the second threshold is not exceeded, the controller may start to process or execute the next host read command.

In some arrangements, the use of the first threshold and the second threshold can allow any number of host commands to be accepted into read buffers until the allocated level (e.g., the amount of read buffers that have been allocated) reaches a new fill threshold or a new allocation threshold (e.g., first threshold). In this domain, many smaller host commands can be accepted to achieve good die activation without causing overflow into the low speed memory. Once the new allocation threshold is exceeded, a new command count threshold (e.g., second threshold) can prevent any further host commands from being accepted unless the total number of in-flight host commands that already have been accepted into the read buffers is not more than (or is greater than or equal to) the new command count threshold. In this domain, a small number of larger host commands can be accepted and utilize a larger size of read buffer which allows these larger commands to also achieve good die activation while not overflowing into the low speed memory.

In some arrangements, a controller (e.g., SSD controller SoC) may track, monitor or determine the number or count of host commands that have been allocated read buffers within the hybrid memory, and provide a first threshold on a read buffer allocation level and a second threshold on a buffer allocation count and/or a count of in-flight host read commands. If the size or amount of the allocated read buffers exceeds the first threshold, the second threshold can prevent allocating a memory space for additional host commands within the hybrid memory by comparing the number of host commands that have been allocated read buffers and/or the count of allocated read buffers with the second threshold. In this manner, the controller SoC can prevent smaller host commands with a large queue depth from overflowing into a low speed memory (e.g., an external memory external to the controller SoC), while allowing enough large host commands to be allocated read buffers and accepted into the controller SoC which when the time comes to read-out the data from the NAND tends to only fill a high speed memory (e.g., SoC-internal memory). In some arrangements, a low speed memory may be allocated for a read command at a command acceptance time, while a high-speed memory can be allocated for the read command at read-out time. For example, the controller may incorporate a smaller, higher speed memory whose allocation can be performed at the point that data becomes available for read-out from the NAND.

In some arrangements, controllers (e.g., controller SoCs) may target different host interfaces (e.g., different PCIe generation and/or lane count), different types and numbers of NAND die, different amounts or sizes of a high speed memory (e.g., SoC-internal memory) available for read buffer space, different speeds of access of a low speed memory (e.g., SoC-external memory) and/or different maximum allowable power consumptions. Based on these possible differences between particular products (e.g., SKUs of controller SoC), or different generations of the SoC, the first threshold and the second threshold (which are programmable parameters by software, hardware or firmware) can be optimized to achieve consistent and relatively high read throughput.

In one approach, a system may include a non-volatile memory (NVM), a first memory, a second memory that has a higher speed than the first memory, and a controller. The controller may be configured to receive a first read command from a host computer. The controller may be configured to determine a size of one or more buffers that are allocated for one or more read commands that have been received and not returned read data to the host computer. The controller may be configured to determine a number of the one or more read commands. The controller may be configured to determine, based on at least the size of the one or more buffers and the number of the one or more read commands, whether to start processing the first read command. In response to determining to start processing the first read command, the controller may be configured to allocate, in the first memory, a first buffer for the first read command.

In some arrangements, in determining whether to start processing the first read command, the controller may be configured to determine whether the size of the one or more buffers exceeds a first threshold. In response to determining that the size of the one or more buffers does not exceed a first threshold, the controller may be configured to determine to start processing the first read command. In response to determining that the size of the one or more buffers exceeds the first threshold, the controller may be configured to determine whether the number of the one or more read commands is smaller than or equal to a second threshold. In response to determining that the number of the one or more read commands is smaller than or equal to the second threshold, The controller may be configured to determine to start processing the first read command. In response to determining the number of the one or more read commands is greater than the second threshold, the controller may be configured to determine not to start processing the first read command. The first threshold may be greater than or equal to a size of the second memory.

In some arrangements, in response to determining that the size of the one or more buffers exceeds the first threshold, the controller may be configured to determine (1) whether the number of the one or more buffers allocated is smaller than or equal to a threshold buffer count, and (2) whether the number of the one or more read commands is smaller than or equal to a threshold command count. In response to determining that (1) the number of the one or more buffers allocated is smaller than or equal to the threshold buffer count, and (2) the number of the one or more read commands is smaller than or equal to the threshold command count, the controller may be configured to determine to start processing the first read command. In response to determining that (1) the number of the one or more buffers allocated is greater than the threshold buffer count, or (2) the number of the one or more read commands is greater than the threshold command count, the controller may be configured to determine not to start processing the first read command.

In some arrangements, in response to determining that a read time of the NVM has elapsed, the controller may be configured to determine whether the second memory has an available space for the first read command. In response to determining that the second memory has an available space for the first read command, the controller may be configured to allocate a second buffer in the second memory and read data from the NVM to the second buffer in the second memory. The controller may be configured to maintain the allocation of the second buffer in the second memory until transfer of the data stored in the second buffer to the host computer is completed.

In some arrangements, in response to determining that the second memory does not have an available space for the first read command, the controller may be configured to read data from the NVM to the first buffer in the first memory. The controller may be configured to maintain the allocation of the first buffer in the first memory until transfer of the data stored in the first buffer to the host computer is completed.

Arrangements in the present disclosure have at least the following advantages and benefits. First, arrangements in the present disclosure can provide useful techniques for reducing the variation in read throughput with various command sizes using the first threshold and the second threshold. For example, such variation can be observed when the read buffer size available in a high speed memory (e.g., SoC-internal memory) is too small to achieve good performance with larger host commands such that a read buffer is additionally allocated in a low speed memory (e.g., SoC-external memory). In some arrangements, the first threshold and the second threshold (which are programmable parameters by software, hardware or firmware) can be optimized to achieve consistent and relatively high read throughput.

Second, arrangements in the present disclosure can provide useful techniques for accommodating or keeping read data in the high speed memory for a wide range of read command sizes and a wide range of queue depths, thereby reducing variation in throughput with data sizes of host commands. This lack of variation with data sizes of host commands can be prized by customers of storage devices (e.g., SSD).

Figure 2:
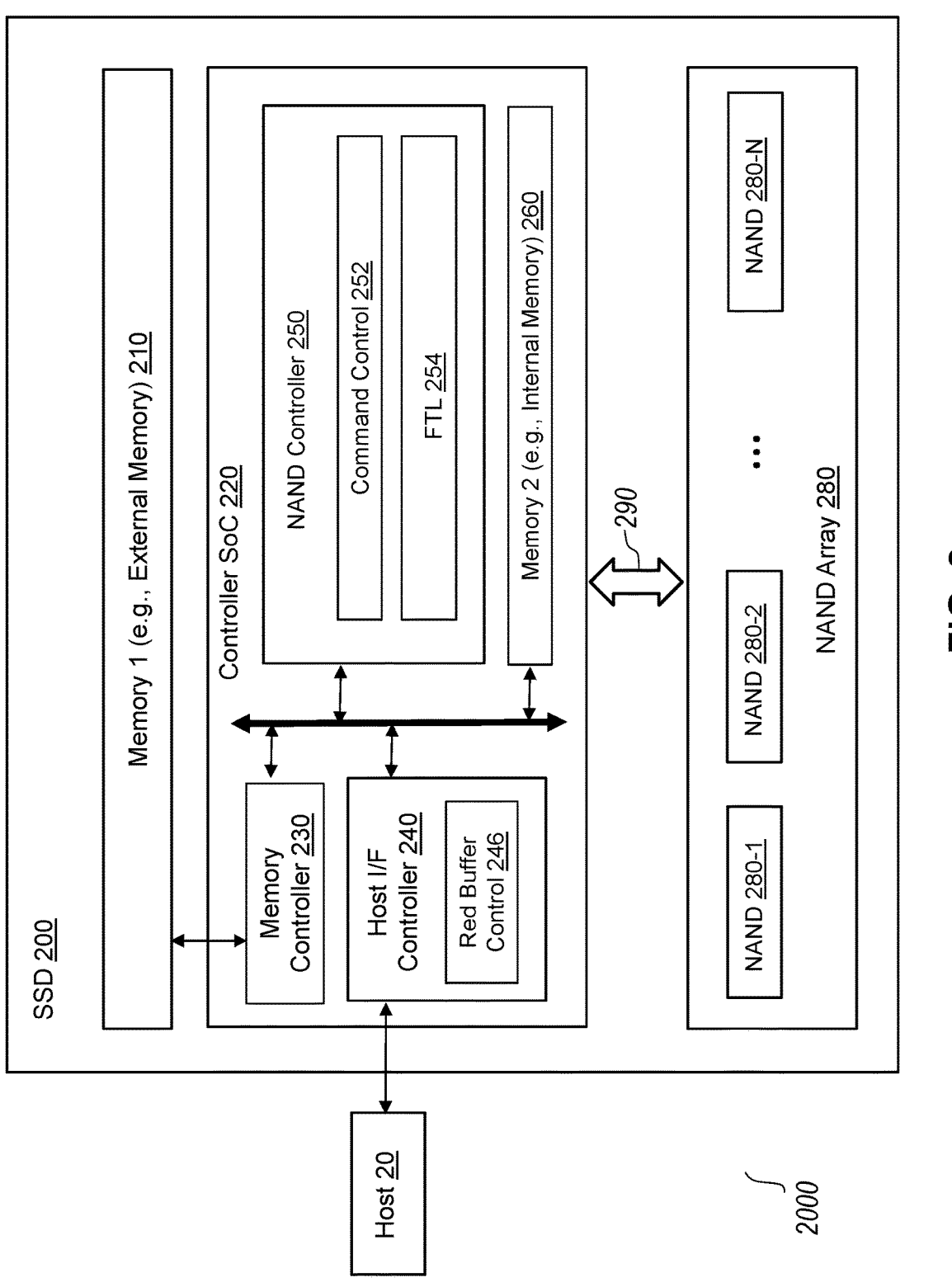
FIG. 2 is a block diagram illustrating an example computer system including a controller system-on-chip (SoC) in an SSD, according to some arrangements.

FIG. 2 is a block diagram illustrating an example computer system 2000 including a controller system-on-chip (SoC) 220 in an SSD 200, according to some arrangements. The computer system 2000 may include a host 20 which may have configuration similar to that of host 10 (see FIG. 1). The SSD 200 is a storage device and may be used as a main storage of an information processing apparatus (e.g., the host 20). The SSD 200 may be incorporated in the information processing apparatus or may be connected to the information processing apparatus via a cable or a network. The SSD 200 may include a second memory 260, a first memory 210, and a NAND array 280. The second memory 260 may have configuration similar to that of the internal memory 124 (see FIG. 1). For example, the second memory 260 may be a high speed internal memory of the controller SoC 220, and/or SRAM. In some arrangements, the second memory 260 may not be an internal memory of the controller SoC 220. The second memory 260 may include one or more read buffers (e.g., read buffers 321, 322, 323, 324 in FIG. 3). The first memory 210 may have configuration similar to that of DRAM 110. For example, the first memory 210 may be DRAM and/or a low speed memory external to the controller SoC 220. The first memory 210 may include one or more read buffers (e.g., read buffers 321, 322, 323, 324 in FIG. 3). In some arrangements, the first memory 210 may not be an external memory external to the controller SoC 220. The NAND array 280 may include a plurality of NAND-type flash memory 280-1, 280-2, . . . , 280-N (e.g., N=16, . . . , 128, etc.). The controller SoC 220 may read data from, or write data to, the NAND array through a NAND bus 290 (e.g., 8-bit or 16 bit data bus).

Figure 3:
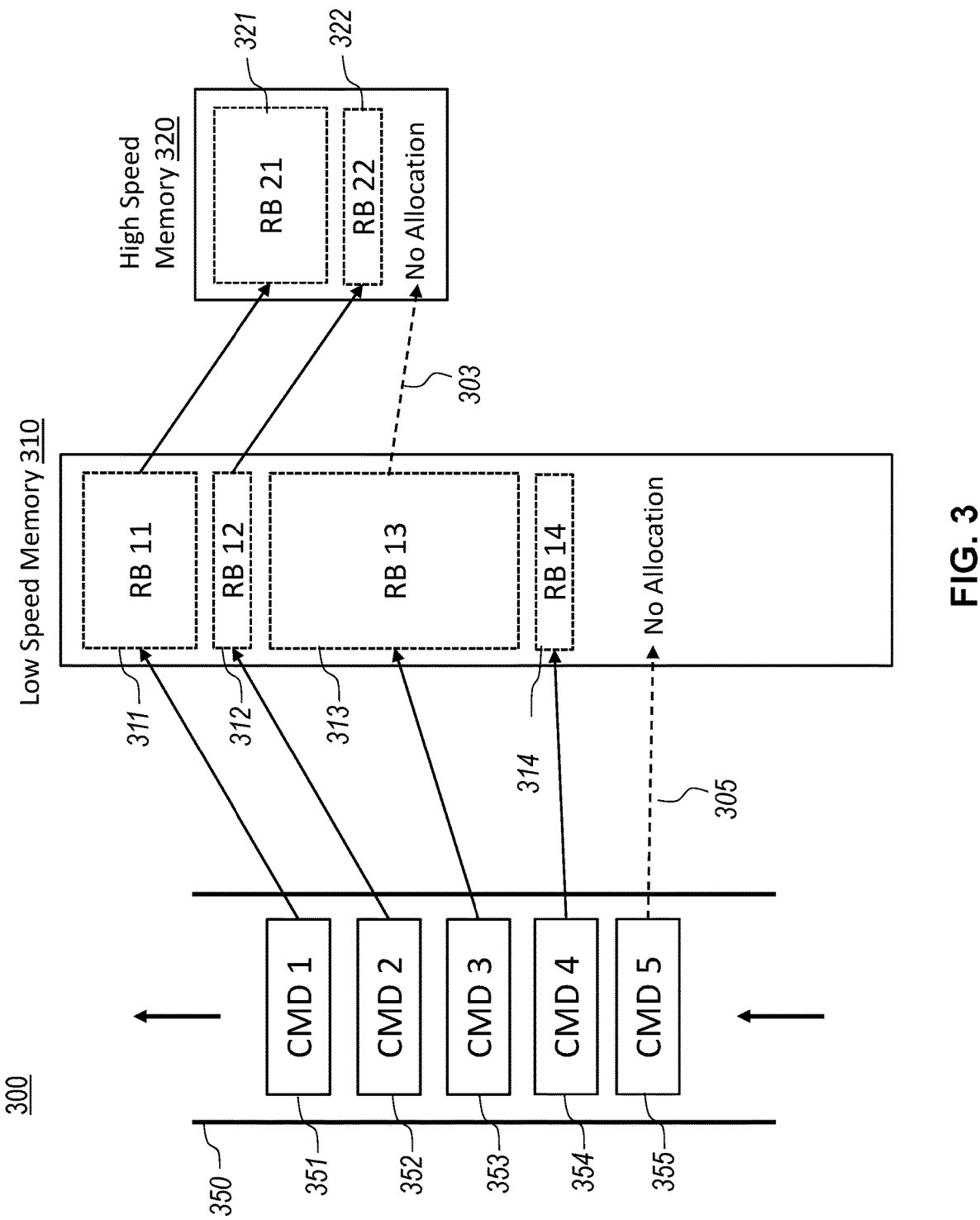
FIG. 3 is a block diagram illustrating an example data structure in memories for allocating read buffers based on data sizes of read commands in an SSD, according to some arrangements.

The controller SoC 220 may be a system-on-chip or an integrated circuit that integrates a NAND controller 220, a memory controller 230, a host I/F controller 240, and/or a volatile memory as the second memory 260 including one or more read buffers (e.g., read buffers 321, 322, 323, 324 in FIG. 3). The controller SoC 220 may be configured to access (e.g., read data from or write data to) the second memory 260 faster than the first memory 210. Each of the NAND controller 220, the memory controller 230, and the host I/F controller 240 may be implemented or performed with a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein.

The NAND controller 250 may function similar to the processor 150 and/or the flash memory I/F 140 (see FIG. 1). For example, the NAND controller may perform a command control 252 to execute command processing for processing various commands received from an information processing apparatus (e.g., a host computer). In some arrangements, the NAND controller may perform a read buffer control 246 (as part of the host I/F controller 240) to allocate a read buffer based on a data size of a host read command. The details of allocating read buffers will be described below with reference to FIG. 3. The NAND controller may be configured to function as a flash translation layer (FTL) 254 to execute data management and block management of the flash memory (e.g., NAND-type flash memory) in the NAND array 280. The NAND controller 250 may be configured to control transfer of data flows in multiple channels (e.g., 16 channels) to or from the NAND array 280 in parallel (through the NAND bus 290). The NAND controller 250 may be configured to perform error correction to extract correct data from data read from the NAND array 280.

The memory controller 230 may function similar to the DRAM I/F 130 (see FIG. 1). For example, the memory controller may manage temporary data buffers (e.g., read buffers, write buffers) for transfer of read/write data and manage look-up table (LUT) data. The host interface controller 240 may function similar to the host I/F 190 (see FIG. 1).

FIG. 3 is a block diagram illustrating an example data structure 300 in memories (e.g., low speed memory 310 and high speed memory 320) for allocating read buffers 311, 312, 313, 314, 321, 322 based on data sizes of read commands 351, 352, 353, 354 in an SSD, according to some arrangements. In some arrangements, the high speed memory 320 may have configuration similar to the second memory 260 or the internal memory 122, and the low speed memory 310 may have configuration similar to the first memory 210 or the external memory 110.

In some arrangements, a first threshold may indicate a buffer allocation limit or a size limit of read buffers that have been allocated in the hybrid memory (e.g., low speed memory 310 and high speed memory 320). The first threshold may indicate a limit against the number of read buffers that have been allocated in the hybrid memory. In some arrangements, the first threshold may be greater than or equal to the size of the high speed memory 320 or may be experimentally determined. For example, in FIG. 3, the first threshold is set to be greater than or equal to the size of the high speed memory 320.

In some arrangements, a second threshold may indicate a level or limit against the number or count of read buffers that have been allocated, and/or the number or count of individual in-flight host commands. The second threshold may be set in order to accept enough commands to activate sufficient die in parallel, without causing significant amounts of read data to pass through the low speed memory 310. The second threshold may be experimentally determined based on real or simulated host command traffic. For example, the second threshold may be the number or count of (relatively)

mid-size host commands that can be allocated in the low-speed memory 310 at command acceptance time without, at read-out time, finding that there is a high-speed memory available into which to read out the data from the NAND. In the example shown in FIG. 3, the second threshold is equal to 3.

In some arrangements, a controller (e.g., controller SoC 220 or host I/F 254 or read buffer control 246) may track, monitor, calculate or determine an amount of read buffers that have been allocated to the current in-flight host read commands (which have been received but not been completed back to the host computer, e.g., have not returned data to the host computer). For example, the controller may receive, in a queue 350, host read commands 351, 352, 353, 354, and 355 in this order. When data for a host read command is read out from NAND and transfer of the data to the host via a read buffer is completed, the host read command may be dequeued or remoted from the queue 350.

When the first host read command 351 is received from the host, the controller may determine whether the amount of read buffers that have been allocated exceeds the first threshold. At this point, no read buffers have been allocated in the low speed memory 310 or the high speed memory 320. In response to determining that the amount of allocated read buffers (e.g., 0) does not exceed the first threshold (which may be greater than or equal to the size of the high speed memory 320), the controller may allocate a read buffer 311 corresponding to the data size of the command 351 in the low speed memory 310, and start to process or execute the command 351.

Next, when the second host read command 352 is received from the host, the controller may determine whether the amount of read buffers that have been allocated exceeds the first threshold. At this point, only the read buffer 311 has been allocated in the low speed memory 310. In response to determining that the amount of allocated read buffers (e.g., the size of the read buffer 311) does not exceed the first threshold (which may be greater than or equal to the size of the high speed memory 320), the controller may allocate a read buffer 312 corresponding to the data size of the command 352 in the low speed memory 310, and start to process or execute the command 352.

Next, when the third host read command 353 is received from the host, the controller may determine whether the amount of read buffers that have been allocated exceeds the first threshold. At this point, the read buffers 311 and 312 have been allocated. In response to determining that the amount of allocated read buffers (e.g., the sum of the sizes of the read buffers 311 and 312) does not exceed the first threshold (which may be greater than or equal to the size of the high speed memory 320), the controller may allocate a read buffer 313 corresponding to the data size of the command 353 in the low speed memory 310, and start to process or execute the command 353.

Next, when the fourth host read command 354 is received from the host, the controller may determine whether the amount of read buffers that have been allocated exceeds the first threshold. At this point, the read buffers 311, 312 and 313 have been allocated in the low speed memory 310. In response to determining that the amount of allocated read buffers (e.g., the sum of the sizes of the read buffers 311, 312 and 313) exceeds the first threshold (which may be greater than or equal to the size of the high speed memory 320), the controller may determine whether the number of the read buffers that have been allocated and/or the number of in-flight host read commands (e.g., three commands 351, 352, 353) exceeds the second threshold (which is equal to 3, for example). In response to determining that the second threshold is not exceeded (e.g., the number of in-flight host read commands is 3 which does not exceed 3), the controller may allocate a read buffer 314 corresponding to the data size of the command 354 in the low speed memory 310 and start to process or execute the command 314.

Next, when the fifth host read command 355 is received from the host, the controller may determine whether the amount of read buffers that have been allocated exceeds the first threshold. At this point, the read buffers 311, 312, 313, 314 have been allocated. In response to determining that the amount of allocated read buffers (e.g., the sum of the sizes of the read buffers 311, 312, 313, 314) exceeds the first threshold (which may be greater than or equal to the size of the high speed memory 320), the controller may determine whether the number of the read buffers that have been allocated and/or the number of in-flight host read commands (e.g., five commands 351, 352, 353, 354) exceeds the second thresholds (which is equal to 3). In response to determining that the second threshold is exceeded, the controller may not allocate 305 a read buffer in the low speed memory 310 (nor in the high speed memory 320) and may not start to process the command 356.

Next, when a NAND read time has elapsed (so that data is about to be read out from the NAND) since the first read command 351 has been accepted (e.g., since the read buffer 311 has been allocated), the controller may determine whether there is a buffer space available for the first command 351 in the high speed memory 320. In response to determining that there is a buffer space available for the first command 351 in the high speed memory 320, the controller may allocate another read buffer 321 for the first command 351 in the high speed memory 320. The controller may read out data (corresponding to the first read command 351) from the NAND to the read buffer 321 in the high speed memory 320. The controller may maintain the allocation of the read buffer 321 in the high speed memory 320 until transfer of the data stored in the read buffer 321 to the host computer is completed.

Next, when a NAND read time has elapsed (so that data is about to be read out from the NAND) since the second read command 352 has been accepted (e.g., since the read buffer 312 has been allocated), the controller may determine whether there is a buffer space available for the second command 352 in the high speed memory 320. In response to determining that there is a buffer space available for the second command 352 in the high speed memory 320, the controller may allocate another read buffer 322 for the second command 352 in the high speed memory 320. The controller may read out data (corresponding to the second read command 352) from the NAND to the read buffer 322 in the high speed memory 320. The controller may maintain the allocation of the read buffer 322 in the high speed memory 320 until transfer of the data stored in the read buffer 322 to the host computer is completed.

Next, when a NAND read time has elapsed (so that data is about to be read out from the NAND) since the third read command 353 has been accepted (e.g., since the read buffer 313 has been allocated), the controller may determine whether there is a buffer space available for the third command 353 in the high speed memory 320. In response to determining that there is no buffer space available for the third command 353 in the high speed memory 320, the controller may not allocate 303 another read buffer for the third command 353 in the high speed memory 320. The controller may read out data (corresponding to the third read command 353) from the NAND to the read buffer 313 in the low speed memory 310. The controller may maintain the allocation of the read buffer 313 in the low speed memory 310 until transfer of the data stored in the read buffer 313 to the host computer is completed.

Figures 4A, 4B:
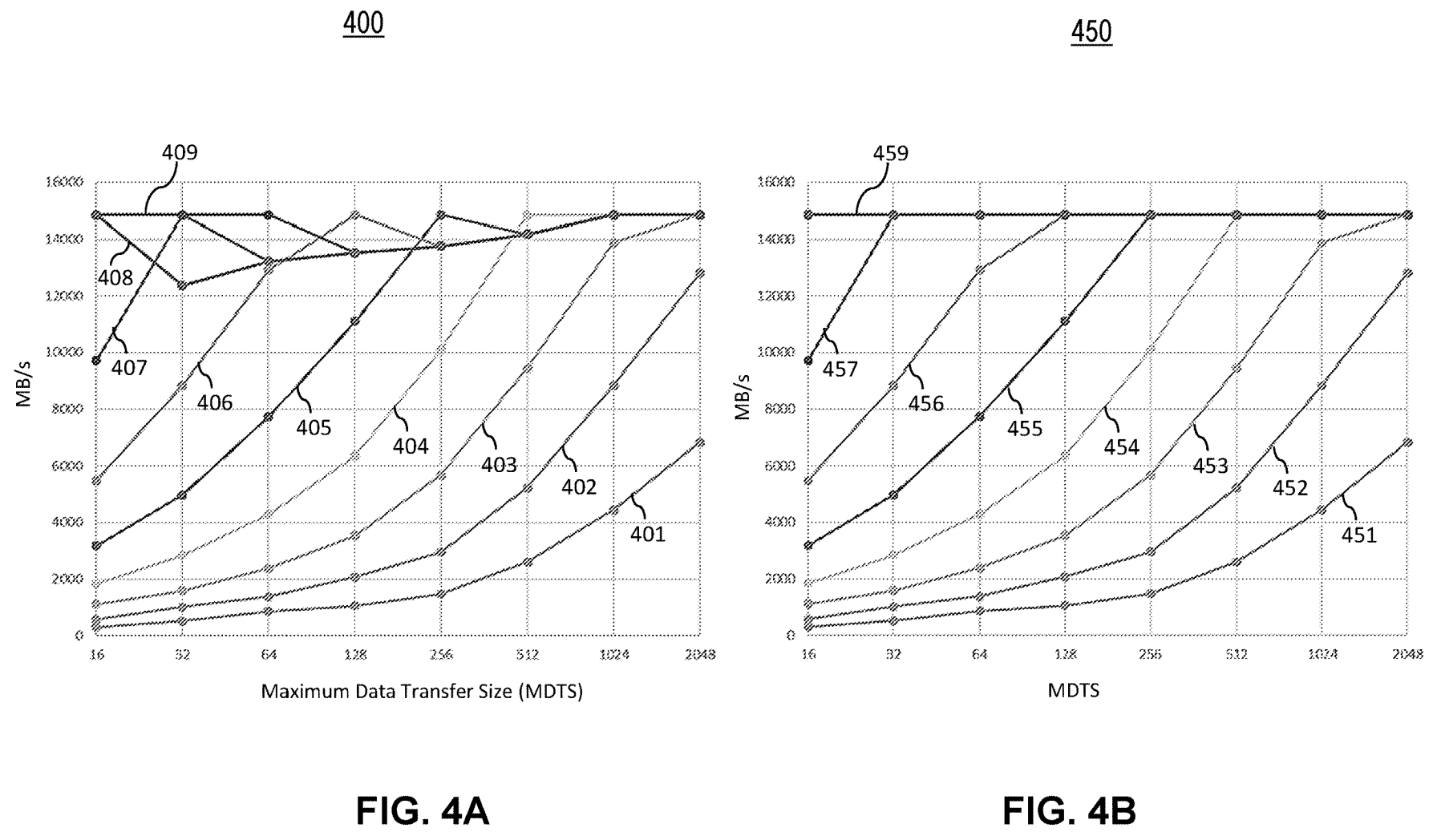

FIG. 4A and FIG. 4B are diagrams 400, 450 showing performance of an SSD when allocating read buffers based on data sizes of read commands, according to some arrangements. FIG. 4A and FIG. 4B show read throughput (of read commands) for various command sizes and queue depths for a system (e.g., SSD 100 or SSD 200) with a limited high speed memory (e.g., memories 122, 260) and additional low speed memory (e.g., memories 110, 210). FIG. 4A shows the read throughput of an SSD (e.g., SSD 100) that does not perform the read buffer control as shown in FIG. 3, over maximum data transfer size (MDTS). In FIG. 4A, a line 401 represents the read throughput with the depth of a command queue equals to 1. Similarly, lines 402, 403, 404, 405, 406, 407, 408, 409 represent the read throughput with the depth of command queues equals to 2, 4, 8, 16, 32, 64, 128, 256, respectively. FIG. 4B shows the read throughput of an SSD (e.g., SSD 200) that performs the read buffer control (e.g., read buffer control 256) as shown in FIG. 3, over MDTS. In FIG. 4B, lines 451, 452, 453, 454, 455, 456, 457, 458, 459 represent the read throughput with the depth of command queues equals to 1, 2, 4, 8, 16, 32, 64, 128, 256, respectively.

FIG. 4A shows good large command performance with low queue depth configurations (e.g., lines 401, 402, 403, 404) by making the total size of read buffer sufficiently large. FIG. 4A, however, shows poor small command performance with high queue depth configurations (e.g., lines 405, 406, 407, 408, 409). In contrast, FIG. 4B shows that some arrangements in the present disclosure (e.g., arrangements shown in FIG. 2 and FIG. 3) can mitigate the drop of read throughput in small commands with high queue depth configurations. For example, FIG. 4B shows good small command performance with high queue depth configurations (e.g., lines 455, 456, 457, 458, 459) with the same good large command performance with low queue depth configurations (e.g., lines 451, 452, 453, 454).

FIG. 5 is a flowchart illustrating an example methodology for allocating read buffers (e.g., read buffers 311, 312, 313, 314) based on data sizes of read commands in an SSD (e.g., SSD 200), according to some arrangements. In this example, the process begins in S502 by receiving a first read command (e.g., read command 351) from a host computer (e.g., host 20) by a controller (e.g., controller SoC 220) configured to access a first memory (e.g., low speed memory 310, first memory 210) and a second memory (e.g., high speed memory 320, second memory 260) that has a higher speed than the first memory. In some arrangements, the controller may be a solid state drive (SSD) controller system-on-chip (SoC) (e.g., controller SoC 220).

In S504, in some arrangements, the controller (e.g., read buffer control 246) may be configured to determine a size of one or more buffers that are allocated for one or more read commands that have been received and not returned read data to the host computer. For example, when the read command 355 is received, one or more buffers 311, 312, 313, 314 are allocated for the read commands 351, 352, 353, 354 that have been received but have not returned read data to the host computer yet, and the controller may determine that the size of the one or more buffers is the sum of the sizes of the read buffers 311, 312, 313, 314.

In S506, in some arrangements, the controller may be configured to determine a number of the one or more read commands. For example, when the read command 355 is received, the read commands 351, 352, 353, 354 that have been received but have not returned read data to the host computer, and the controller may determine the number of the one or more read commands to be 4.

In S508, in some arrangements, the controller may be configured to determine, based on at least the size of the one or more buffers and the number of the one or more read commands, whether to start processing the first read command. For example, for the read command 354, the controller may determine whether to start processing the read command 354 based on at least the size of the one or more buffers (e.g., sum of sizes of read buffers 311, 312, 313) and the number of the one or more read commands (e.g., three commands 351, 352, 353).

In some arrangements, in determining whether to start processing the first read command (e.g., for the read command 354), the controller may determine whether the size of the one or more buffers (e.g., sum of sizes of read buffers 311, 312, 313) exceeds a first threshold (e.g., first threshold that may be greater than or equal to the size of the high speed memory 320). In response to determining that the size of the one or more buffers does not exceed the first threshold, the controller may determine to start processing the first read command.

In response to determining that the size of the one or more buffers exceeds the first threshold, the controller may determine whether the number of the one or more read commands (e.g., three read commands 351, 352, 353) is smaller than or equal to a second threshold (e.g., three). In response to determining that the number of the one or more read commands is smaller than or equal to the second threshold, the controller may determine to start processing the first read command. In response to determining the number of the one or more read commands (e.g., three read commands 351, 352, 353, 354) is greater than the second threshold (e.g., three), the controller may determine not to start processing the first read command. The first threshold may be greater than or equal to a size of the second memory.

In response to determining that the size of the one or more buffers exceeds the first threshold, the controller may determine (1) whether the number of the one or more buffers allocated is smaller than or equal to a threshold buffer count, and (2) whether the number of the one or more read commands is smaller than or equal to a threshold command count. In response to determining that (1) the number of the one or more buffers allocated is smaller than or equal to the threshold buffer count, and (2) the number of the one or more read commands is smaller than or equal to the threshold command count, the controller may determine to start processing the first read command. In response to determining that (1) the number of the one or more buffers allocated is greater than the threshold buffer count, or (2) the number of the one or more read commands is greater than the threshold command count, the controller may determine not to start processing the first read command.

In S510, in some arrangements, in response to determining to start processing the first read command (e.g., the read command 354), the controller may allocate, in the first memory (e.g., low speed memory 310), a first buffer (e.g., read buffer 314) for the first read command (e.g., read command 354). In some arrangements, in response to determining that a read time of the NVM has elapsed, the controller may determine whether the second memory (e.g., high speed memory 320) has an available space for the first read command. For example, for the read command 352, in response to determining that a read time of the NVM has elapsed since the read command 352 has been accepted, the controller may determine whether the high speed memory

320 has an available space for the read command 352. In response to determining that the second memory has an available space for the read command 352, the controller may allocate a second buffer (e.g., read buffer 322) in the second memory (e.g., high speed memory 320) and read data from the NVM to the read buffer 322 in the high speed memory 320. The controller may maintain the allocation of the read buffer 322 in the high speed memory 320 until transfer of the data stored in the read buffer 322 to the host computer is completed.

In some arrangements, in response to determining that the second memory does not have an available space for the first read command, the controller may read data from the NVM to the first buffer in the first memory. For example, for the read command 353, in response to determining that a read time of the NVM has elapsed since the read command 353 has been accepted, the controller may determine that the high speed memory 320 does not have an available space for the read command 353. The controller may not allocate a read buffer in the high speed memory 320, and read data from the NVM to the read buffer 313 in the low speed memory 310. The controller may maintain the allocation of the read buffer 313 in the low speed memory 310 until transfer of the data stored in the read buffer 313 to the host computer is completed.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of steps in the processes disclosed is an example of illustrative approaches. Based upon design preferences, it is understood that the specific order or hierarchy of steps in the processes may be rearranged while remaining within the scope of the previous description. The accompanying method claims present elements of the various steps in a sample order, and are not meant to be limited to the specific order or hierarchy presented.

The previous description of the disclosed implementations is provided to enable any person skilled in the art to make or use the disclosed subject matter. Various modifications to these implementations will be readily apparent to those skilled in the art, and the generic principles defined herein may be applied to other implementations without departing from the spirit or scope of the previous description. Thus, the previous description is not intended to be limited to the implementations shown herein but is to be accorded the widest scope consistent with the principles and novel features disclosed herein.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the steps of various examples must be performed in the order presented. As will be appreciated by one of skill in the art the order of steps in the foregoing examples may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general purpose processor, a DSP, an ASIC, an FPGA or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary examples, the functions described may be implemented in hardware, software, firmware, or any combination thereof. The functions implemented in software may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable any person skilled in the art to make or use the present disclosure. Various modifications to these examples will be readily apparent to those skilled in the art, and the generic principles defined herein may be applied to some examples without departing from the spirit or scope of the disclosure. Thus, the present disclosure is not intended to be limited to the examples shown herein but is to be accorded the widest scope consistent with the following claims and the principles and novel features disclosed herein.

What is claimed is:

1. A system comprising:
a non-volatile memory (NVM);
a first memory;
a second memory that has a higher speed than the first memory; and
a controller configured to:
    receive a first read command from a host computer;
    determine a size of one or more buffers that are allocated for one or more read commands that have been received and not returned read data to the host computer;
    determine a number of the one or more read commands;
    determine, based on at least the size of the one or more buffers and the number of the one or more read commands, whether to start processing the first read command;
    in response to determining to start processing the first read command, allocate, in the first memory, a first buffer for the first read command; and
    after allocating the first buffer but before data for the first read command has been returned to the host computer, determining whether to allocate a second buffer in the second higher speed memory for the first read command.

2. The system of claim 1, wherein in determining whether to start processing the first read command, the controller is configured to:
    determine whether the size of the one or more buffers exceeds a first threshold; and
    in response to determining that the size of the one or more buffers does not exceed the first threshold, determine to start processing the first read command.

3. The system of claim 2, wherein the controller is configured to:
    in response to determining that the size of the one or more buffers exceeds the first threshold, determine whether the number of the one or more read commands is smaller than or equal to a second threshold; and in response to determining that the number of the one or more read commands is smaller than or equal to the second threshold, determine to start processing the first read command.

4. The system of claim 3, wherein the controller is configured to:
    in response to determining the number of the one or more read commands is greater than the second threshold, determine not to start processing the first read command.

5. The system of claim 2, wherein the first threshold is greater than or equal to a size of the second memory.

6. The system of claim 2, wherein the controller is configured to:
    in response to determining that the size of the one or more buffers exceeds the first threshold, determine (1) whether the number of the one or more buffers allocated is smaller than or equal to a threshold buffer count, and (2) whether the number of the one or more read commands is smaller than or equal to a threshold command count;
    in response to determining that (1) the number of the one or more buffers allocated is smaller than or equal to the threshold buffer count, and (2) the number of the one or more read commands is smaller than or equal to the threshold command count, determine to start processing the first read command; and
    in response to determining that (1) the number of the one or more buffers allocated is greater than the threshold buffer count, or (2) the number of the one or more read commands is greater than the threshold command count, determine not to start processing the first read command.

7. The system of claim 1, wherein the controller is configured to:
    in response to determining that a read time of the NVM has elapsed, determine whether the second memory has an available space for the first read command; and
    in response to determining that the second memory has an available space for the first read command, allocate the second buffer in the second memory and read data from the NVM to the second buffer in the second memory.

8. The system of claim 7, wherein the controller is configured to:
    maintain the allocation of the second buffer in the second memory until transfer of the data stored in the second buffer to the host computer is completed.

9. The system of claim 7, wherein the controller is configured to:
    in response to determining that the second memory does not have an available space for the first read command, read data from the NVM to the first buffer in the first memory.

10. The system of claim 9, wherein the controller is configured to:
    maintain the allocation of the first buffer in the first memory until transfer of the data stored in the first buffer to the host computer is completed.

11. A method for reading data from a non-volatile memory (NVM), the method comprising:
    receiving, by a controller configured to access a first memory and a second memory that has a higher speed than the first memory, a first read command from a host computer;

determining, by the controller, a size of one or more buffers that are allocated for one or more read commands that have been received and not returned read data to the host computer;

determining, by the controller, a number of the one or more read commands;

determining, by the controller, that at least one of the size of the one or more buffers is smaller than or equal to a threshold buffer size and the number of the one or more read commands is smaller than or equal to a threshold command count;

in response to determining that at least one of the size of the one or more buffers is smaller than or equal to the threshold buffer size and the number of the one or more read commands is smaller than or equal to the threshold command count, allocating, in the first memory, a first buffer for the first read command; and after allocating the first buffer but before data for the first read command has been returned to the host computer, determining to allocate a second buffer in the second higher speed memory for the first read command.

12. The method of claim 11, further comprising:

in response to determining that the size of the one or more buffers exceeds the threshold buffer size, determining whether the number of the one or more read commands is smaller than or equal to the threshold command count; and in response to determining that the number of the one or more read commands is smaller than or equal to the threshold command count, determining to start processing the first read command.

13. The method of claim 12, further comprising:

in response to determining the number of the one or more read commands is greater than the threshold command count, determining not to start processing the first read command.

14. The method of claim 11, wherein the threshold buffer size is greater than or equal to a size of the second memory.

15. The method of claim 11, further comprising:

in response to determining that the size of the one or more buffers exceeds the threshold buffer size, determining (1) whether a number of the one or more buffers allocated is smaller than or equal to a threshold buffer count, and (2) whether the number of the one or more read commands is smaller than or equal to the threshold command count;

in response to determining that (1) the number of the one or more buffers allocated is smaller than or equal to the threshold buffer count, and (2) the number of the one or more read commands is smaller than or equal to the threshold command count, determining to start processing the first read command; and in response to determining that (1) the number of the one or more buffers allocated is greater than the threshold buffer count, or (2) the number of the one or more read commands is greater than the threshold command count, determining not to start processing the first read command.

16. The method of claim 11, wherein determining whether to allocate the second buffer in the second higher speed memory includes determining whether the second memory has an available space for the first read command; and in response to determining that the second memory has an available space for the first read command, allocating the second buffer in the second memory and read data from the NVM to the second buffer in the second memory.

17. The method of claim 16, further comprising:

maintaining the allocation of the second buffer in the second memory until transfer of the data stored in the second buffer to the host computer is completed.

18. The method of claim 16, further comprising:

in response to determining that the second memory does not have an available space for the first read command, reading data from the NVM to the first buffer in the first memory.

19. The method of claim 18, further comprising:

maintaining the allocation of the first buffer in the first memory until transfer of the data stored in the first buffer to the host computer is completed.

* * * * *